Feb. 26, 1935.  A. B. DIETERICH  1,992,476

CORN SHELLER

Filed June 25, 1931  3 Sheets-Sheet 1

Witness
Milton Lenoir

Inventor
Arthur B. Dieterich
By Brown, Jackson, Boettcher & Dienner
Attorneys.

Feb. 26, 1935.  A. B. DIETERICH  1,992,476
CORN SHELLER
Filed June 25, 1931  3 Sheets-Sheet 2

Inventor.
Arthur B. Dieterich
By Brown, Jackson, Boettcher & Diemer
Attorneys.

Witness
Milton Lenoir

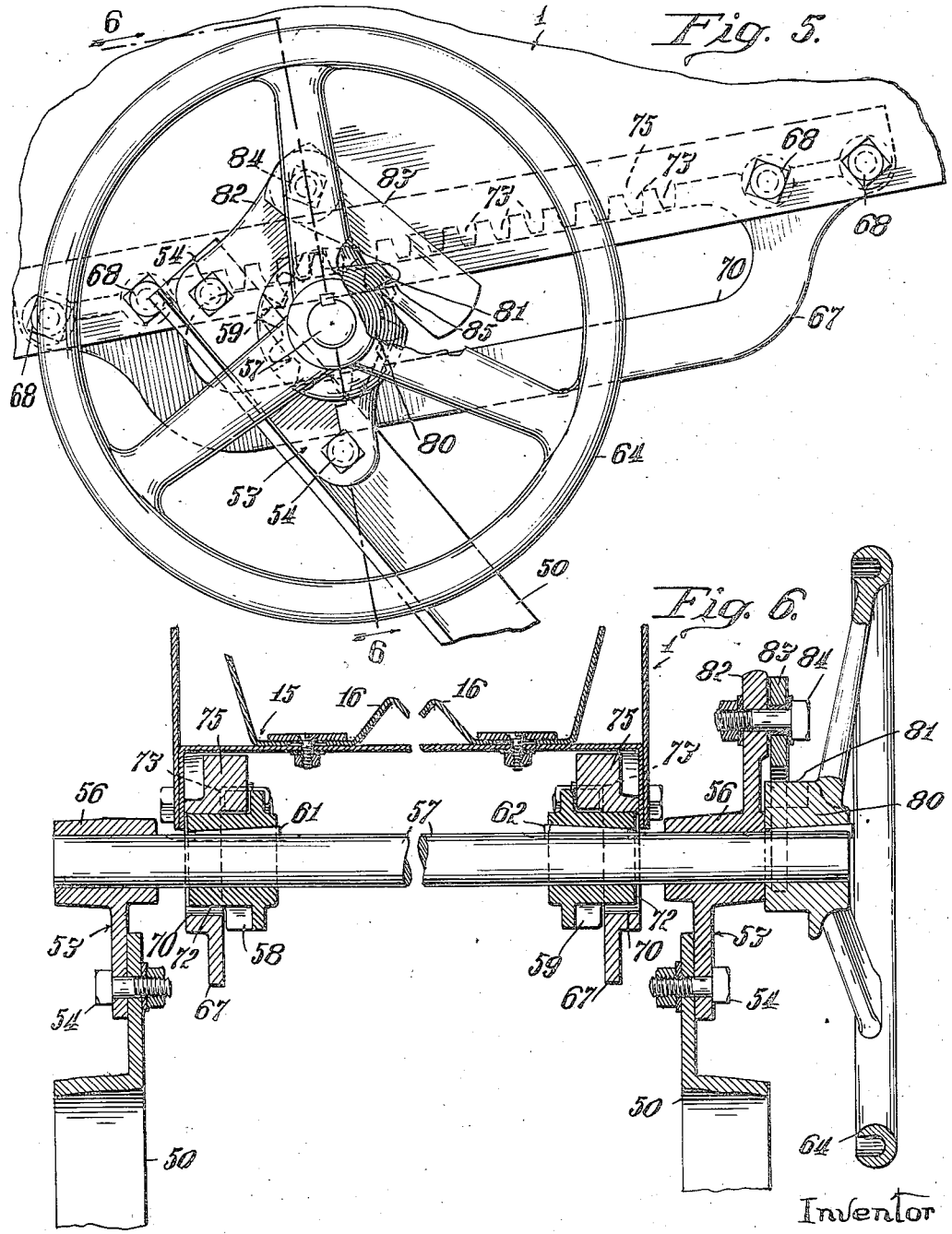

Patented Feb. 26, 1935

1,992,476

UNITED STATES PATENT OFFICE 1,992,476

CORN SHELLER

Arthur B. Dieterich, Moline, Ill., assignor to Deere & Company, Moline, Ill., a corporation of Illinois Application June 25, 1931, Serial No. 546,685

21 Claims. (Cl. 130—33)

The present invention relates generally to corn shellers and is primarily concerned with certain new and useful improvements in feeders for conveying ears of corn to the shelling mechanism of the corn sheller, the present application being a division of my copending application Serial No. 465,942, filed July 7, 1930, for a Corn sheller. More specifically, the principal object of the present invention is to provide an improved supporting means for pivotally connecting the upper end of the conveyor to the sheller frame proper and to provide an improved means for adjusting the outer or receiving end of the conveyor vertically.

Other objects and advantages of the present invention will be apparent to those skilled in the art after a consideration of the following detailed description of the preferred structural embodiment, taken in conjunction with the accompanying drawings in which:

Figure 5 is an enlarged fragmentary detailed view showing the manual adjusting means for raising and lowering the outer or receiving end of the feeder; and Figure 6 is a cross-section of the conveyor or feeder raising and lowering means and corresponding to a view taken substantially along the line 6—6 of Figure 5.

Figure 1:
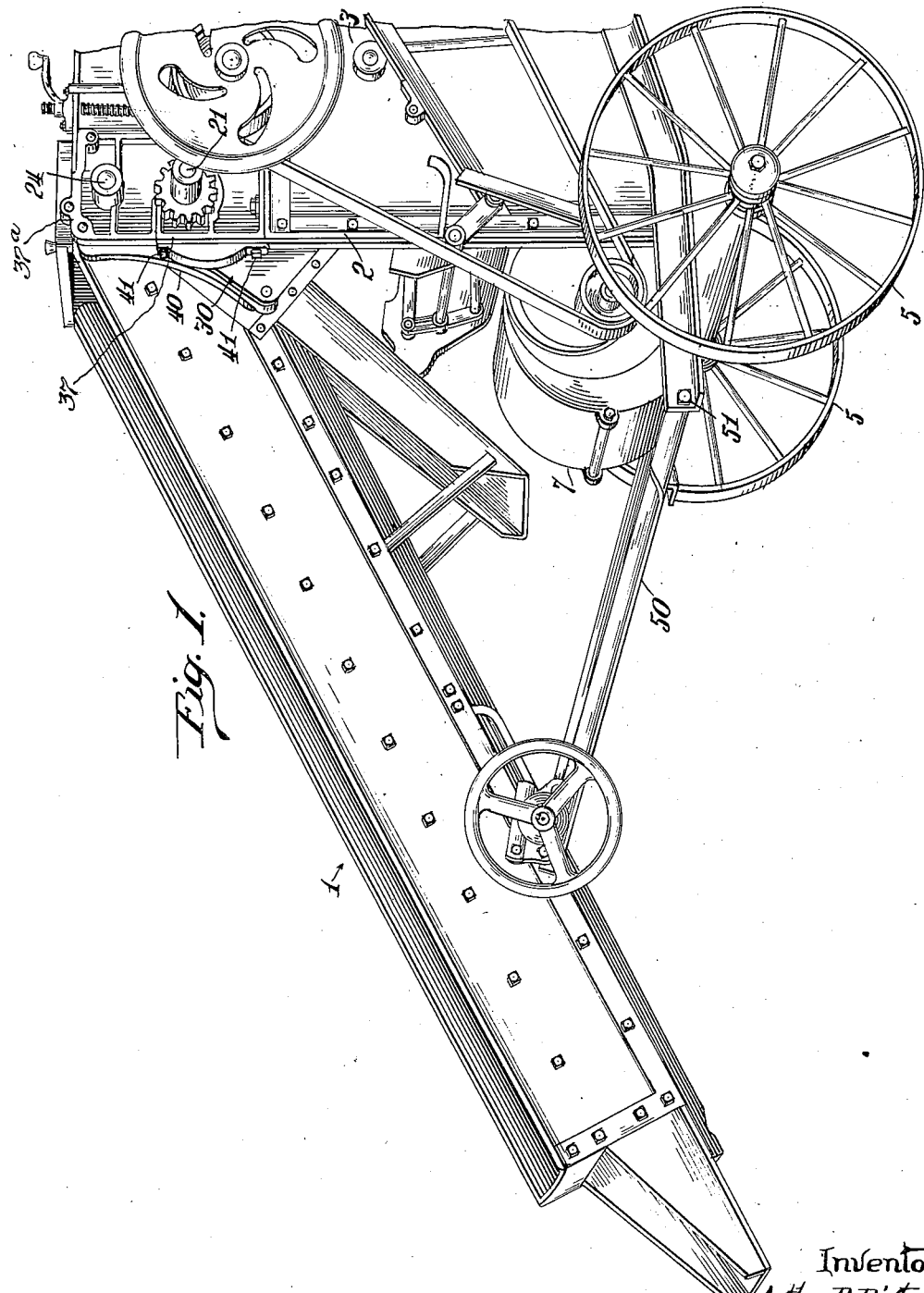
Figure 1 is a fragmentary perspective view showing my improved feeder or conveyor mounted on the receiving end of the corn sheller, the corn sheller being identical with the one disclosed and claimed in my copending application referred to above.

Referring now to the drawings, particularly Figure 1, the reference numeral 1 indicates the conveyor or feeder in its entirety and which is pivotally supported upon the frame 2 of the sheller as will be explained later more in detail. The frame 2 of the sheller carries the usual casings or panels 3 which serve to protect the mechanism of the sheller. The sheller as a whole is mounted upon the usual supporting wheels 5 by which the entire machine may be transported from place to place, and the sheller mechanism includes the usual fan or blower 7, as well as other mechanism such as a grain elevator, a bagging apparatus, a blower for blowing out the silks, husks, dust and the like, and a cob stacker for conveying the cobs to one side of the machine, as more clearly disclosed in my copending application referred to above.

Figure 3:
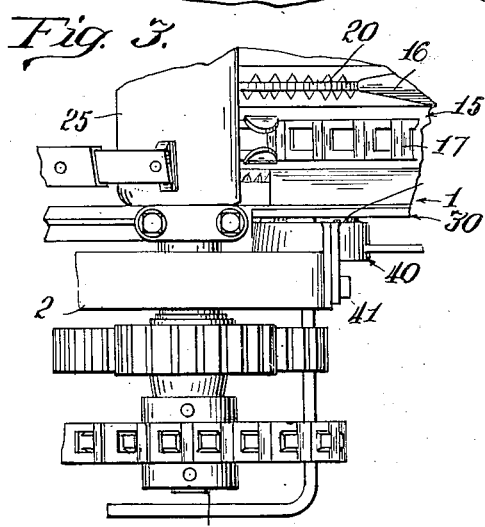
Figure 3 is a fragmentary top plan view of the upper end of the feeder or conveyor and corresponding to the view shown in Figure 2.
Figure 4:
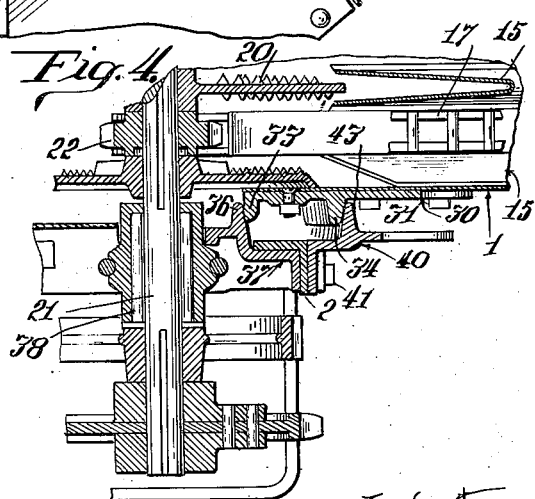
Figure 4 is a cross-sectional view taken substantially along the line 4—4 of Figure 2.

The conveyor 1 is provided with a ridged bottom 15 having ridges 16 with a plurality of drag chains 17 running upwardly between the ridges 16, as best shown in Figures 3 and 4. The purpose of the ridges 16 and the drag chains 17 is to deliver the ears of corn in longitudinal alignment with respect to the shelling mechanism proper.

The shelling mechanism per se forms no part of the present invention and hence it will suffice to note that in this application the shelling mechanism is represented by the feed wheels 20 secured to a feed shaft 21 extending transversely of the sheller frame 2 and provided with sprockets 22 secured thereto between adjacent feed wheels and over which the rear bights of the drag chains 17 are trained, as best shown in Figure 4. Preferably, these sprockets are keyed to the feed wheel shaft 21, but this is not essential in that the sprockets may be secured to the shaft 21 in any desired manner. The shelling mechanism also includes a beater (not shown) fixed to a beater shaft 24, see Figures 1 and 2, journaled on the sheller frame 2 directly above the feed wheel shaft 21, the beater proper being rotatable underneath the rag iron support 25. For other details of the shelling mechanism reference may be had to my copending application identified above.

Figure 2:
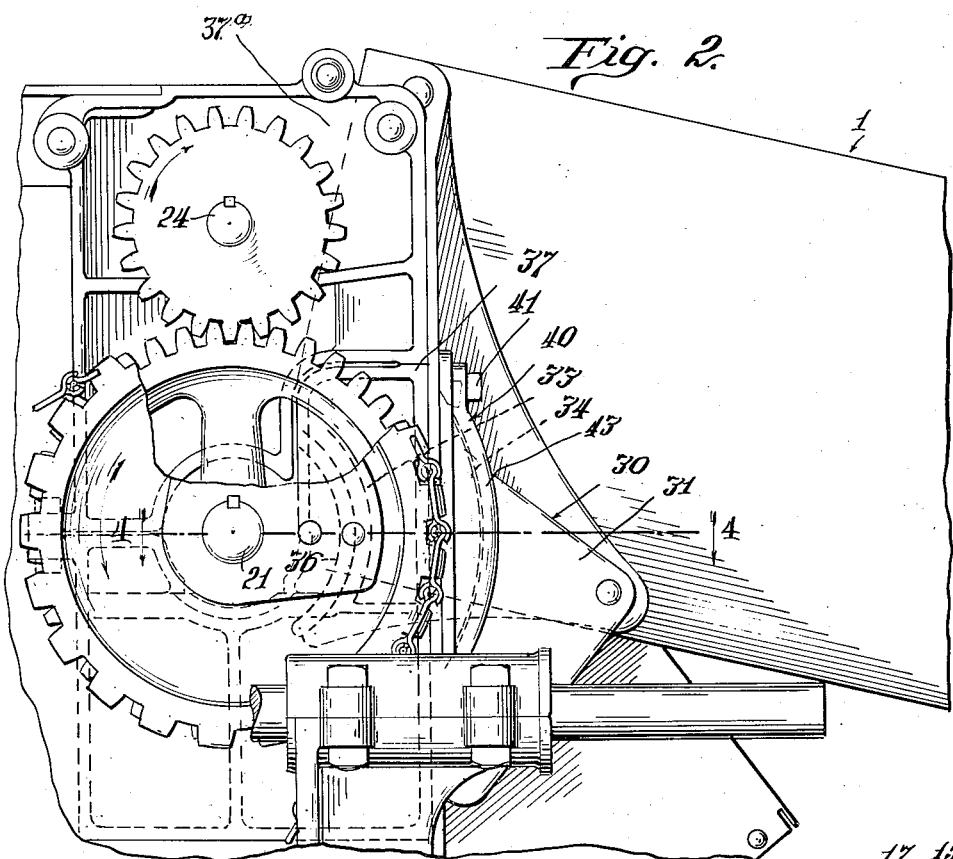
Figure 2 is an enlarged fragmentary elevation with certain parts being broken away to better show the support for the upper end of the conveyor.

The upper end of the conveyor or feeder 1 is pivotally attached to the sheller so as to be capable of up and down movement with respect thereto by means which will now be described. On each side of the feeder at its upper end a casting 30 is bolted. This casting is in the form of a plate member 31 having outwardly extending bearing flanges 33 and 34, these flanges being concentric as best shown in Figure 2 and spaced radially of each other. The inner edge of the inner flange 33 and the outer edge of the outer flange 34 provide bearing surfaces of substantially cylindrical contour. The curvature of the inner flange 33 is greater than the curvature of the outer flange 34, see Figure 2, and the inner flange is so arranged that its inner bearing surface bears upon the bearing surface of a stationary bearing flange 36 which extends inwardly from a casting member 37 which, with a complementary casting 37a, supports the bearings 38 of the feed wheel shaft 21 and the bearing for the beater shaft 24. Because of their greater curvature the bearing flanges 33 and 36 support the principal part of the weight of the upper end of the feeder or conveyor.

In order to maintain the bearing flanges 33 and 36 in operative relation a removable casting 40 is provided and which is bolted by means of bolts 41 to the lower casting member 37. The casting 40 is provided with an inwardly extending flange 43 having an inner bearing surface engaging the outer cylindrical bearing surface of the outer flange 34 of the plate member 30. Obviously, when the two removable castings, one at each side of the feeder 1, are removed the feeder may be withdrawn from the sheller by simply moving the same away from the inwardly extending stationary bearing flange 36. By virtue of this construction, therefore, the feeder is thus pivotally mounted at its uper end, being mounted for up and down movement about the axis of curvature of the several bearing flanges 33, 34, 36 and 43, and the feeder may be quickly detached by simply removing the bolts 41 and the castings 40. Furthermore, if desired, the upper casting member 37a, together with the feed wheel shaft 21 and the beater shaft 24, can be removed from the machine without disturbing the feeder 1. This is so because the castings 37 and 37a are separable and the feeder 1 is connected only with the lower casting member 37.

The receiving end of the feeder 1 may be raised and lowered by novel manually operated mechanism which will now be described. Referring more particularly to Figures 5 and 6, it will be noted that the receiving end of the conveyor or feeder 1 is supported by means of a pair of braces or supporting members 50, see Figure 1, suitably pivoted at their lower ends to the frame 2 of the sheller, as by pivots or bolts 51.

At their upper ends the brace members 50 carry castings 53 bolted thereto, as by bolts 54, and providing journal bearings 56 in which a shaft 57 is journaled for rotation. A pair of pinions 58 and 59 are secured, as by keys 61 and 62, to the shaft 57. The outer end of the shaft has a hand wheel 64 suitably secured thereto.

A pair of castings 67 are bolted by bolts 68 to the underside of the framework of the feeder 1, as best shown in Figure 6. These castings have an elongated slot 70 in each one, and these slots receive the shaft 57, as shown in Figure 5. Each of the pinions 58 and 59 is provided with a hub 72 which engages the upper edge of associated slot 70 and, in effect, provides a rolling support for the lower end of the feeder or conveyor 1. The teeth of the pinions 58 and 59 engage teeth 73 formed in the lower edge of the upper portion 75 of the castings 67. The portions 75 act as racks cooperating with the pinions 58 and 59, and while I have shown the racks 75 as formed integral with the castings 67 it will be obvious that they may be formed separately if desired and secured adjacent the slots 70 in any manner desired.

Reference has been made to the hand wheel 64 keyed to the pinion shaft 57. The hand wheel 64 has a hub 80 provided with ratchet teeth 81, see Figure 5, and the right hand casting 53 as viewed in Figure 6 is provided with an upstanding ear or lug 82 to which is pivoted a locking pawl 83, as by means of a pivot bolt 84. The locking pawl 83 includes a shoulder or tooth 85 which engages one of the teeth 81 on the wheel hub 82 which thus prevents the weight of the outer or receiving edge of the feeder from causing the rotation of the pinions 58 and 59 and the shaft 57.

The elevation of the receiving end of the feeder or conveyor 1 may be varied by rotating the shaft 57 by the hand wheel 64. To elevate the lower end of the feeder 1 the hand wheel 64 is rotated in a counter-clockwise direction as viewed in Figure 5, thereby moving the upper ends of the brace members 50 inwardly along the feeder 1 toward its pivotal axis. This causes the brace members 50 to raise the feeder 1. When it is desired to lower the feeder 1 all that it is necessary to do is to release the pawl 83 and allow the weight of the feeder 1 to rotate the shaft 57 under control of the hand wheel 64. At any point in its travel between the upper and lower ends of the slots 70 may be engaged with the ratchet teeth 81 on the hand wheel hub 80 to thereby hold the feeder in that position.

While I have described in connection with the accompanying drawings one preferred embodiment of my invention, it is to be understood that my invention is not to be limited to the specific structure shown and described but that, in fact, widely different means may be employed in the practice of the broader aspects of my invention.

What I claim, therefore, and desire to secure by Letters Patent is:

1. In a corn sheller, the combination of a conveyor, a frame including vertical rear posts, journal castings secured to the upper end of the conveyor, each comprising outwardly extending cylindrical bearing flanges, a feed wheel shaft mounted in the frame, journal means for said shaft including a pair of castings secured to said posts and each having inwardly extending flanges cooperating with the first mentioned flanges to pivotally support said conveyor, each casting of said pair comprising detachable parts whereby said conveyor may be removed.

2. In a corn sheller having a frame, the combination of a conveyor, journal castings secured to the upper end of the conveyor, each casting comprising a flat plate provided with a pair of outwardly extending cylindrical bearing flanges, said flanges being concentrically arranged and spaced radially of one another, journal means on the corn sheller frame to receive the inner flange of each of the castings, and a clamping member removably connected with the frame of the corn sheller and cooperating with the other of said flanges on each of the castings for the purpose of holding the upper end of the conveyor in place.

3. In a corn sheller having a frame, the combination of a conveyor, journal castings secured to the upper end of the conveyor on opposite sides thereof, each comprising a pair of outwardly extending cylindrical bearing flanges, said flanges being concentric, means on the frame of the corn sheller to receive the inner flange of each of the castings to thereby support the upper end of the conveyor, and a detachable member having an inwardly extending flange adapted to bear against the outer surface of the other of said flanges on each of the castings, said last named member being removably connected with the frame of the corn sheller.

4. In a machine having a frame, the combination of a conveyor, journal castings secured to one end of the conveyor on opposite sides thereof, each comprising a pair of outwardly extending cylindrical bearing flanges, supporting means on the frame to receive one of said flanges, and means detachably secured to the frame and cooperating with the other flange to hold said first flange and supporting means in operative relation.

5. In a corn sheller, in combination, a frame, a shelling mechanism carried by said frame, conveyor means for feeding corn to said mechanism, said conveyor means including a plurality of drag chains and means pivotally supporting the conveyor on the frame, and means for raising and lowering the receiving end of said conveyor comprising brace means one end of which is pivoted to the frame at a point spaced from the pivotal axis of the conveyor, a shaft journaled in the other end of said brace means, a pinion on said shaft, means serving as a rack cooperating with said pinion and fixedly secured to the conveyor, handle means on said shaft whereby the latter may be manually adjusted to raise and lower the receiving end of the conveyor, and means for holding the shaft in adjusted position.

6. In a corn sheller, in combination, a frame, shelling mechanism on said frame, conveyor means for feeding corn to said mechanism, said conveyor means including a drag chain and means pivotally supporting the conveyor on the frame, and means for raising and lowering the receiving end of said conveyor comprising a pair of brace members pivoted at their inner ends to said frame below the pivotal connection of said conveyor, the outer ends of said brace members being connected together, a shaft journaled in said outer ends and provided with pinions and a hand wheel secured thereto, oppositely mounted slotted castings secured to the conveyor and provided with rack teeth meshing with said pinions and having said slots embracing said shaft, and latch means cooperating with ratchet teeth formed on the hub of said hand wheel to restrain outward movement of the shaft relative to said conveyor.

7. In a corn sheller, in combination, a frame, shelling mechanism in said frame, conveyor means for feeding corn to said mechanism, means pivotally supporting the conveyor on the frame, and means for raising and lowering the receiving end of said conveyor comprising brace means one end of which is pivoted to the frame, a pinion and pinion shaft journaled in the outer end of said brace means, a rack fixed to said conveyor and extending longitudinally thereof, said pinion meshing with said rack whereby rotation of said pinion shaft raises and lowers the receiving end of said conveyor, a holding ratchet fixed to said shaft, and pawl means pivotally supported on said brace means and cooperating with said ratchet for holding the conveyor in adjusted position.

8. In a corn sheller, in combination, a main frame, conveyor means for feeding corn to said sheller, means pivotally supporting the upper end of the feeding means on said frame, and means for raising and lowering the receiving end of said conveyor, comprising brace means pivotally connected with said frame at one end, a pinion and pinion shaft journaled in the outer end of said brace means, a rack fixed to said conveyor and extending longitudinally thereof, said pinion meshing with said rack whereby rotation of said pinion shaft raises and lowers the receiving end of said conveyor, means adjustably holding the pinion shaft in any position, and means having rolling contact with the conveyor for supporting the same on the outer end of said brace means.

9. Means for raising and lowering one end of a pivoted feeder, said means comprising a pair of interconnected vertically swinging arms, journal castings secured to the outer ends of said arms, a shaft journaled in said castings, a pair of pinions secured to said shaft, a pair of rack members respectively cooperating with said pinions and secured to the swinging end of said feeder, cylindrical rollers also secured to said shaft, and flat bearing means on said feeder and cooperating with said rollers to support the weight of the swinging end of said feeder on said rollers independently of said rack and pinion means.

10. In a corn sheller, in combination, an upright frame, a corn feeding conveyor removably pivoted to the frame, and means for raising and lowering the receiving end of said conveyor, said means comprising a swinging member removably pivoted to the frame below the pivot connection of said conveyor, a pinion shaft journaled in the outer end of said swinging member and provided with a pair of pinions secured thereto, each of said pinions having a toothed surface and a roller surface, and rack means secured to said conveyor and including a pair of members each having a toothed surface adapted to cooperate with the toothed portions of said pinions and a flat bearing surface adapted to cooperate with the roller surfaces of said pinions.

11. In a corn sheller, in combination, an upright frame, a corn feeding conveyor removably pivoted to the frame, and means for raising and lowering the receiving end of said conveyor, said means comprising a swinging member removably pivoted to the frame below the pivot connection of said conveyor, a pinion shaft journaled in the outer end of said swinging member and provided with a pair of pinions secured thereto, each of said pinions having a toothed surface and a roller surface, rack means secured to said conveyor and including a pair of members each having a toothed surface adapted to cooperate with the toothed portions of said pinions and a flat bearing surface adapted to cooperate with the roller surfaces of said pinions, and means mounted on said swinging member for holding the shaft against rotation in any adjusted position.

12. A corn sheller comprising a frame, conveyor means for directing corn to the sheller, pivotal supporting means for the upper end of said conveyor comprising cooperating sets of journal flanges providing cylindrical bearing surfaces, one set of flanges being secured to the frame and comprising separable parts whereby the conveyor may be detached from the frame, and means for adjusting the outer receiving end of said conveyor comprising brace means one end of which is pivoted to the frame at a point spaced from the pivotal axis of the conveyor, the other end of which is provided with rack and pinion mechanism for adjustably supporting the receiving end of said conveyor, and means for holding said last named mechanism in adjusted position.

13. In a corn sheller, in combination, a frame, a pair of separable upper and lower casting members carried thereby, a beater shaft and a feed wheel shaft journaled in said castings, the upper of said casting members and said shafts being removable, and a feeder pivotally supported at its upper end on the lower casting member.

14. A corn sheller comprising a frame, a pair of casting members secured at each side thereof near the upper part of the frame, said members being separable, the lower members being fixed to the frame while the upper casting members are removable, a beater shaft carried by and removable with the upper casting members, and a feed conveyor removably pivoted on the fixed casting members.

15. In a corn sheller, in combination, a frame, a pair of separable upper and lower casting members carried thereby, a beater shaft and a feed wheel shaft journaled in said castings, the upper of said casting members and both of said shafts being removable, and a conveyor pivotally supported at its upper end on one of said casting members.

16. In a corn sheller, the combination of a conveyor, a frame on which the conveyor is pivotally mounted, journal castings secured to the upper end of the conveyor, each comprising a flat plate provided with outwardly extending bearing flanges in the form of cylindrical sectors only partially embracing the pivot axis of said conveyor, thereby providing for the removal of the latter from said frame, journal means on the frame to receive said flanges and including sets of cooperating inwardly extending flanges, said flanges constituting the sole support for the upper end of said conveyor, and means detachably securing one set of flanges to said frame.

17. In a corn sheller, the combination of a conveyor, a frame on which the conveyor is pivotally mounted, journal castings secured to the upper end of the conveyor, each comprising a flat plate provided with outwardly extending bearing flanges in the form of cylindrical sectors only partially embracing the pivot axis of said conveyor, thereby providing for the removal of the latter from said frame, journal means on the frame to receive said flanges and including sets of cooperating inwardly extending flanges disposed on opposite sides of and embracing said outwardly extending bearing flanges, said flanges constituting the sole support for the upper end of said conveyor, and means detachably securing certain of said inwardly extending flanges to said frame.

18. In a corn sheller, the combination of a conveyor, a frame, journal castings secured to the conveyor, each comprising outwardly extending cylindrical bearing flanges, a feed wheel shaft mounted in the frame, drag chains actuated thereby, journal means for said shaft including pairs of castings secured to said frame and each pair having inwardly extending flanges cooperating with the first mentioned flanges to pivotally support said conveyor, said cooperating flanges being arcuate about a center of curvature coinciding with the axis of said shaft whereby pivotal movement of the conveyor will not disturb the tension of said drag chains, and means detachably connecting one of the castings of each pair.

19. In a corn sheller having a frame, the combination of a conveyor, journal castings secured to the conveyor, each casting comprising a flat plate provided with a pair of outwardly extending cylindrical bearing flanges, a shaft supported for rotation in said frame, said flanges being concentrically arranged with respect to the axis of rotation of said shaft and spaced radially of one another, journal means on the corn sheller frame for said shaft and adapted to receive the inner flange of each of the castings, and a clamping member removably connected with the frame of the corn sheller and provided with a portion also arcuate about the axis of said shaft and cooperating with the other of said flanges on each of the castings for the purpose of holding the conveyor in place.

20. In a corn sheller, in combination, a frame, a pair of separable upper and lower casting members carried thereby, a beater shaft and a feed wheel shaft having sprockets, said beater shaft being journaled in the upper casting members and the feed wheel shaft being mounted between the upper and lower casting members, whereby the removal of the upper casting members provides for the removal of both of said shafts, and a conveyor pivotally supported on certain of said casting members and including drag chains trained over said sprockets.

21. In a corn sheller, in combination, a frame, pairs of separable upper and lower casting members carried thereby, a beater shaft journaled for rotation in the upper casting members, a feed wheel shaft having sprockets thereon, means journaling the feed wheel shaft between the upper and lower casting members, the upper of said casting members and said beater shaft being removable and the removal of the upper casting members and said beater shaft providing for the removal of said feed wheel shaft, and a conveyor pivotally supported at one end on the lower casting members and having drag chains trained over said sprockets, said conveyor being removable from said lower casting members after the beater shaft and the upper casting members have been removed.

ARTHUR B. DIETERICH.